United States Patent [19]

Yamanishi et al.

[11] 3,993,620

[45] Nov. 23, 1976

[54] POWDERED FACING AGENT

[75] Inventors: Akio Yamanishi, Neyagawa; Tetsuya Imazato, Kyoto, Japan

[73] Assignee: Kabushiki Kaisha Komatsu Seisakusho, Tokyo, Japan

[22] Filed: May 28, 1974

[21] Appl. No.: 473,894

[30] Foreign Application Priority Data

May 29, 1973 Japan................................ 48-59362

[52] U.S. Cl................................ 260/38; 106/38.22; 260/838; 260/844; 260/DIG. 40
[51] Int. Cl.²..................... C04B 35/68; C08K 3/34; C08L 61/06
[58] Field of Search........... 106/38.22; 260/38, 838, 260/844, DIG. 40

[56] References Cited

UNITED STATES PATENTS

| 3,004,312 | 10/1961 | Froberger | 260/DIG. 40 |
| 3,180,632 | 4/1965 | Katz et al. | 106/38.22 X |
| 3,410,718 | 11/1968 | Smith | 260/838 |
| 3,582,369 | 6/1971 | Nouveau | 106/38.22 |
| 3,635,877 | 1/1972 | Van Wyk | 260/DIG. 40 |

*Primary Examiner*—Lewis T. Jacobs
*Assistant Examiner*—S. M. Person
*Attorney, Agent, or Firm*—Armstrong, Nikaido & Wegner

[57] ABSTRACT

A powdered facing agent for use in forming a shell mold, which is composed of a powdered refractory, such as silica, alumina, zircon, silex, magnesia, etc., a novolak type phenol resin, a resol type phenol resin and/or vinyl acetate resin.

3 Claims, No Drawings

POWDERED FACING AGENT

BACKGROUND OF THE INVENTION

1. Field of the Invention

This invention relates to a powdered facing agent for use in forming a shell mold, and more particularly to a powdered facing agent composed of a powdered refractory, such as silica, alumina, zircon, silex, magnesia, etc., a novolak type phenol resin, a resol type phenol resin and/or vinyl acetate resin.

2. Description of the Prior Art

In forming a shell mold, it is a usual practice to coat a facing agent on the surface of a metal die for the purpose of obtaining a fine casting surface. Therefore, this facing agent is required to have properties that it is softened by heating, that it well adheres to a metal die when it is coated thereon, and that it loses its adhering force to the metal die when resin coated sand is brought to back up, while it well adheres to a shell mold made of the resin coated sand backed up, particularly in case that it is parted away from the metal die.

The facing agent widely used at present is of the type which is composed of a powdered silica mixed with, for instance, a novolak type phenol resin used as a thermosetting agent and hexamethylenetetramine used as a hardening agent. The facing agent of this type has a good adherence property to the metal die. However, it has disadvantages that the adherence thereof to the shell mold is poor when it is parted away from the metal die, and accordingly a coated film formed by coating the facing agent onto the metal die tends to remain on the metal die. Additionally, even when it has adhered to the shell mold, the coated film tends to peel off from the shell mold during pouring.

In order to eliminate the above-described disadvantages of the conventional facing agent, we heretofore proposed a novel facing agent composed of a powdered refractory, such as silica, alumina, zircon, silex, magnesia, etc., a novolak type phenol resin, and a small amount of vinyl acetate resin, which has a good adherence property to resin coated sand as a back-up material and has a good parting property from the metal die, as disclosed in U.S. Patent Application Ser. No. 362,240 filed May 21, 1973 (now abandoned). However, through our further careful study, we found that the facing agent of this type also has the following disadvantages:

At the portions where the coated film is too thick, unhardened portions tends to occur, thereby weakening the adhering force of the coated film to the backed up resin coated sand, with a result that, the coated film is partially left on the metal die. On the other hand, at the portions where the temperature of the metal die is too low, unhardened coated film also tends to occur, with a result that, the coated film tends to be left on the metal die. Accordingly, a temperature control must be carried out so that the difference of the temperature of the metal die may be minimized.

In the case of the facing agent containing a novolak type phenol resin, a hardening rate control for the coated film is difficult even if vinyl acetate resin is admixed therewith. When hexamine is admixed with the facing agent in order to control the hardening rate of the coated film, its reaction becomes too rapid. As a result, veining tends to occur and the adhesion of the coated film to the backed up resin coated sand tends to be deteriorated.

SUMMARY OF THE INVENTION

The present invention is intended to eliminate the aforementioned disadvantages of the conventional facing agent for use in forming a shell mold, and to provide a novel and improved facing agent used therefor.

It is, therefore, an object of the present invention to provide a facing agent for use in forming a shell mold, wherein a hardening rate thereof can be controlled freely.

It is another object of the present invention to provide a facing agent for use in forming a shell mold, which has an excellent adherence property to a shell mold when resin coated sand is brought to back up.

It is still another object of the present invention to provide a facing agent for use in forming a shell mold, which has an excellent parting property from a metal die after resin coated sand is brought to back up.

In order to achieve the foregoing objects, there is provided in the present invention a facing agent for use in forming a shell mold, which is composed of a powdered refractory comprising at least one member selected from the group consisting of silica, alumina, zircon, silex, magnesia, etc., a novolak type phenol resin, a resol type phenol resin and/or vinyl acetate resin.

DETAILED DESCRIPTION OF THE INVENTION

Our studies prove that a powdered facing agent containing a novolak type phenol resin admixed with a suitable amount of a resol type phenol resin can improve the adherence property thereof to a back-up material and the parting property from a metal die on which it is coated and can form a coated film on the metal die even when the metal die is heated at a temperature lower than that heretofore adopted, and therefore can be applied over a wider range of temperature of the metal die.

More particularly, if a shell mold is formed by using the facing agent according to the present invention, the most optimum hardening time thereof is selected so as to meet the working conditions of the shell mold, and a novolak type phenol resin and a resol type phenol resin are properly combined with each other so as to meet this hardening time, and the combination of both resins strengthens the binding force between the coated film and resin coated sand as a back-up material.

For example, if the temperature of the metal die is relatively low, or if the molding speed is fast, a large amount of resol type phenol resin is combined, while if the temperature of the metal die is high, or if the molding speed is slow, a small amount of resol type phenol resin is combined, and therefore a large amount of nobolak type phenol resin is combined.

The operation by the variation of the combining ratio of the resol type phenol resin and novolak type phenol resin in the facing agent according to the present invention will now be described in detail in the following.

The facing agent made only of a novolak type phenol resin without combining with a resol type phenol resin at all introduces the fact that, when the temperature of metal die is below 240° C, the coated film remains on the metal die in adherence thereto.

However, when 85 parts, by weight, of novolak type phenol resin is combined with 15 parts, by weight, of resol type phenol resin, the coated film may be formed in the range of the temperature of the metal die of 230° to 290° C, and when the resol type phenol resin is increased to 30 parts and the novolak type phenol resin is decreased to 70 parts, by weight, the temperature of the metal die may be used in the range of 220° to 285° C. In this case if a small amount of vinyl acetate resin is added thereto, the parting property of the coated film from the metal die is further improved, and the adherence between the coated film and the back-up material becomes superior.

When 55 parts of novolak type phenol resin is combined with 45 parts of resol type phenol resin, the coated film may be formed on the metal die in the range of the temperature of the metal die of 280° to 210° C even if vinyl acetate resin is not combined therewith.

However, if contents of resol type phenol resin are excessively increased, the formation of the coated film on the surface of the metal die becomes difficult, and the adherence property of the coated film to the back-up material and the coated film itself become worse, which is not preferable.

For example, if 30 parts of novolak type phenol resin is combined with 70 parts of resol type phenol resin, it may be used in the range of the temperature of the metal die of 280° to 210° C without difficulty, but in such combining ratio of the novolak type phenol resin and the resol type phenol resin, that is, when the content of resol type phenol resin is increased, the hardening rate of the coated film becomes slightly faster, and when it is coated onto the metal die, the coated film tends to be spattered by the air pressure of injection of the coated film, and the coated film thus formed becomes rough. Therefore it tends to become a worse coated film.

If the resol type phenol resin is further increased, such as, for example, when 25 parts of novolak type phenol resin is combined with 75 parts of resol type phenol resin, the range of the applying temperature of the facing agent becomes remarkably narrow, and yet the formation of the coated film onto the surface of the metal die becomes extremely difficult, in addition, the adhesion thereof to the back-up material becomes worse, and further cracks occur in the coated film.

It may be seen from the foregoing description, that it is not preferable than an excessive amount of resol type phenol resin is combined, and accordingly it is proper in the present invention that the combining ratio of the novolak type phenol resin to the resol type phenol resin is 90 to 40 to 10 to 60, and particularly the facing agent made by using the phenol resin consisting of 85 to 55 parts of novolak type phenol resin and 15 to 45 parts of resol type phenol resin is most preferable.

The refractory powder as a basic powder of the facing agent according to the present invention may be silica, alumina, zircon, silex, magnesia, etc., as described above.

The agent for forming the coated film to be combined with the base powder is admixed normally in the range of 20 to 30 parts, by weight, to 100 parts, by weight, of the base powder. Said agent for forming the coated film is not only the mixture of novolak type phenol resin and resol type phenol resin, but also 3 to 5 %, by weight, of vinyl acetate resin may be further added to the base powder for the purpose of improving the adhering property of the coated film to the back-up material.

The hardening rate of the facing agent of the present invention may be freely controlled by selecting a proper combining ratio of the resol type phenol resin to the novolak type phenol resin, and at the same time, by combining resol type and novolak type phenol resins with each other in a hardened state, the parting property of the coated film from the metal die after resin coated sand as a back-up material is brought to back up may be enhanced. This results from the fact that the resins existing in the resin coated sand and the novolak type phenol resin contained within the unhardened facing agent applied onto the metal die combine with each other and become hard at the contacting boundary therebetween, which is simultaneous with the hardening of the resin coated sand, so as to enhance the adhesion of the coated film to the resin coated sand, at the same time, to improve the parting property of the coated film from the metal die.

Further, the addition of iron sand to the powdered facing agent having a composition as described above may provide a good casting surface with cast products made particularly of SC materials on Japanese Industrial Standards, and it prevents an occurrence of veining.

The following Examples are construed by way of illustration only, but the present invention is not limited to these.

EXAMPLE 1

Powdered facing agent composed, by weight, of;

| | |
|---|---|
| powdered silica: | 100 parts, |
| phenol resin: | 25 parts, | which is composed of 60 parts by weight of novolak type phenol resin and 40 parts by weight of resol type phenol resin,

| | |
|---|---|
| vinyl acetate resin: | 3 parts, and |
| iron sand: | 15 parts; | was made up in the following manner:

30%, by weight based on the weight of the phenol resin composed of 60 parts by weight of novolak type phenol resin and 40 parts by weight of resol type phenol resin, of methanol was added to the phenol resin and the mixture thus obtained was liquefied. On the other hand, to the vinyl acetate resin was added 30%, by weight, based on the vinyl acetate resin, of acetone. Then, the above powdered silica, liquefied phenol resin containing methanol, vinyl acetate resin containing acetone and iron sand were mixed and kneaded for 30 minutes. In this case, a wall temperature of mixer was held at 70° C so that solvent tends to be evaporated easy.

The mixture thus obtained jellied, and as the temperature thereof was decreased, it was slightly hardened. Then, it was introduced to a granulator to form it in noodle state, and thereafter it was introduced into a screening machine to form it in particles having diameters of 2mm to 4mm. After these particles were dried, they were pulverized so as to obtain a powdered facing agent of approximately 300 meshes.

The powdered facing agent thus obtained was coated on an annular casting metal die heated at a temperature of 210° C.

In case of a conventional facing agent containing only novolak type phenol resin, the coated film sometimes adhered to the metal die when the metal die was heated to such a low temperature, but in case of the facing agent according to the present invention, such unfavourable phenomenon did not occur, on the contrary, a preferable coated film was formed on the back-up material as a shell mold, and yet the workability was extremely good.

EXAMPLE 2

A powdered facing agent composed, by weight, of;

| | |
|---|---|
| powdered silica: | 100 parts, |
| phenol resin: | 20 parts, | which is composed of 70 parts by weight, based on the phenol resin, of novolak type phenol resin and 30 parts by weight, based on the phenol resin, of resol type phenol resin;
was made up in the following manner:

Firstly, 6 parts by weight, based on the weight of the powdered silica, of powdered resol type phenol resin and 100 parts by weight of the powdered silica were uniformly mixed by using a mixer. Then, to the powdered mixture thus obtained was added 14 parts by weight, based on the weight of the powdered silica, of liquefied novolak type phenol resin obtained by adding 40%, by weight based on the novolak type phenol resin, of methanol to the powdered novolak type phenol resin, and the resulting mixture was mixed and kneaded for 20 minutes.

The jellied mixture thus obtained was formed in powdery form by the same manner as described in the Example 1.

Using the powdered facing agent thus obtained, a plate metal die having a thickness of 10mm, a length of 150mm and a width of 50mm and heated at a temperature of 280° C was coated. The coated film thus obtained was extremely good. When aluminium alloy was casted by using a shell mold of which its peripheral surface was coated with the coated film, a preferable casting having a fine casting surface of 12.5 to 25S was obtained, and yet there occurred no veining and exfoliation of the coated film.

EXAMPLE 3

A powdered facing agent composed, by weight, of;

| | |
|---|---|
| Powdered silica: | 100 parts, |
| phenol resin: | 25 parts, | which is composed of 50 parts, by weight based on the phenol resin, of novolak type phenol resin and 50 parts, by weight base on the same, of resol type phenol resin; was made up in the following manner:

12.5 parts, by weight based on the powdered silica, of powdered resol type phenol resin and 100 parts by weight of the powdered silica was uniformly mixed by using a mixer. Then, 12.5 parts, by weight based on the powdered silica, of liquefied novolak type phenol resin obtained by adding 50%, by weight, based on the novolak type phenol resin, of methanol thereto was added to the powdered mixture as obtained above, and the resulting mixture was mixed and kneaded for 25 minutes.

The jellied mixture thus obtained was formed in powdery form by the same manner as described in the foregoing Example 1.

By using the above powdered facing agent, a name plate metal die having the size of 150mm × 100mm × 7mm and heated at a temperature of 250° C was coated. When FC material of Japanese Industrial Standards was casted by using a shell mold of which its peripheral surface was coated with the coated film thus obtained, an extremely good casting could be obtained. Further, the parting property of the coated film from the metal die was good, and yet the adherence property of that to the back-up material was also good.

What is claimed is:

1. A powdered facing agent for use in forming a shell mold and consisting essentially of a powdered refractory, a novolak type phenol resin and a resol type phenol resin; the ratio of said novolak type phenol resin to said resol type phenol resin being in the range of 90 to 40 parts, by weight, novolak type phenol resin to 10 to 60 parts, by weight, resol type phenol resin; and the total parts by weight of said novolak type phenol resin and resol type phenol resin in said facing agent being 20 to 30 parts per 100 parts of said powdery refractory.

2. A powdered facing agent as set forth in claim 1, wherein said powdered refractory comprises at least one member selected from the group consisting of silica, alumina, zircon, silex and magnesia.

3. A powdered facing agent for use in forming a shell mold and comprising a powdered refractory, a novolak type phenol resin, a resol type phenol resin and a vinyl acetate resin; the ratio of said novolak type phenol resin to said resol type phenol resin being in the range of 90–40 parts, by weight, novolak type phenol resin to 10–60 parts, by weight, resol type phenol resin; the total amount of novolak type phenol resin and resol type phenol resin in the facing agent being 20–30% by weight, based on the weight of the powdered refractory, and the amount of vinyl acetate resin being 3–5% by weight, based on the weight of the powdered refractory.

* * * * *